(12) United States Patent
Hasdenteufel

(10) Patent No.: US 11,260,786 B2
(45) Date of Patent: Mar. 1, 2022

(54) TRAILER FOR LAUNCHING AND HANDLING LIGHTWEIGHT BOATS

(71) Applicant: Pierre Hasdenteufel, Nice (FR)

(72) Inventor: Pierre Hasdenteufel, Nice (FR)

( * ) Notice: Subject to any disclaimer, the term of this patent is extended or adjusted under 35 U.S.C. 154(b) by 444 days.

(21) Appl. No.: 15/528,746

(22) PCT Filed: Nov. 20, 2015

(86) PCT No.: PCT/IB2015/002190
§ 371 (c)(1),
(2) Date: Mar. 16, 2018

(87) PCT Pub. No.: WO2016/079587
PCT Pub. Date: May 26, 2016

(65) Prior Publication Data
US 2018/0029517 A1    Feb. 1, 2018

(30) Foreign Application Priority Data
Nov. 21, 2014   (FR) ...................... 1461302

(51) Int. Cl.
*B60P 3/10* (2006.01)
*B60P 1/04* (2006.01)
*B62D 61/08* (2006.01)

(52) U.S. Cl.
CPC ............. *B60P 3/1033* (2013.01); *B60P 1/04* (2013.01); *B62D 61/08* (2013.01)

(58) Field of Classification Search
CPC ............. B60P 1/04; B60P 1/08; B60P 3/1033

USPC ........................................................ 180/19.2
See application file for complete search history.

(56) References Cited

U.S. PATENT DOCUMENTS

| 4,676,330 | A | 6/1987 | Roberts | |
| 10,011,152 | B1 * | 7/2018 | Kremkau | ............... B60F 3/0015 |
| 2014/0202778 | A1 * | 7/2014 | Barrett | ..................... B60S 9/215 |
| | | | | 180/12 |

FOREIGN PATENT DOCUMENTS

| FR | 2098750 A5 | 7/1970 | |
| FR | 2098750 A | 2/1972 | |
| FR | 2614004 A1 | 4/1987 | |
| FR | 2614004 A | 10/1988 | |
| FR | 2614004 A1 * | 10/1988 | ............ B60P 3/1033 |
| FR | 2879554 A1 | 12/2004 | |
| FR | 2879554 A | 6/2006 | |
| JP | 10329598 A | 12/1998 | |

* cited by examiner

*Primary Examiner* — Tony H Winner
*Assistant Examiner* — Felicia L. Brittman
(74) *Attorney, Agent, or Firm* — Andrew Wilford

(57) ABSTRACT

The invention relates to a trailer that is especially used for moving over very soft ground and for launching lightweight boats, comprising a motor-driven supporting running gear (11) designed to hold the hull of the boat and extended by a longitudinal edge (12) ending in a lift jack (13) comprising a maneuvering handle (132). The supporting running gear (11) comprises an essentially tubular frame (111) arranged transversely to the longitudinal axis of the trailer, and to which a sealed differential-motor reducer unit (14) or an electric motor could be fixed.

10 Claims, 15 Drawing Sheets

TRAILER FOR LAUNCHING AND HANDLING LIGHTWEIGHT BOATS

FIELD OF THE INVENTION

The invention relates to the general field of handling devices enabling heavy and/or large objects to move and in particular to devices for the onshore handling of boats.

More specifically, the invention is intended for handling "lightweight" boats for launching and landing operations of such boats.

CONTEXT OF THE INVENTION—PRIOR ART

In the particular context of recreational boating or more generally boating on lightweight boats, the user of such a boat in certain cases be able to access the body of water on which he wants to navigate, and to put his boat in the water from the shore without being able to use launching facilities such as those found in ports or docks (launching ramps suitable for motor vehicles, lifting means, etc.).

This is particularly the case if the boat is brought near the body of water on a trailer towed by a vehicle from a track suitable for vehicles but not offering direct access to the shore, the drivable track being for example separated from the shore by grassland itself not suitable for vehicles. This is also the case if the place where the boat is kept or stored is separated from the shore by a sand beach, sometimes very broad at low tide, or an area of very soft ground, by its nature not accessible to vehicles or to a standard trailer.

In such a context it is necessary either to carry out the boat portage by hand or to use a trailer attachment especially designed to be able to traverse areas of terrain inaccessible to a standard trailer such as those enabling a boat to be transported by road.

Trailer attachments currently exist that enable a lightweight boat to be launched. They are generally designed so as to be lightweight and capable of passing over non-drivable terrains with their loads. They are also generally provided with gripping means that enable them to be moved by hand, without using a towing vehicle.

However, circumstances exist where such trailer attachments are difficult to use. This is particularly the case when the "lightweight" boat has a relatively high weight and/or when the terrain is particularly irregular or soft. In this case, launching or landing the boat under consideration requires the user to expend much energy even if the trailer is suitable for moving over irregular ground. The user is then generally forced to use another person to help move the boat between its storage or parking space and the edge of the shore, such that he loses his autonomy.

PRESENTATION OF THE INVENTION

An object of the invention is to propose a means that enables a boat to be moved autonomously, without the use of a towing vehicle, in an area that separates its storage or parking space from the waterfront, and that can be easily implemented by only one person, even in difficult terrain.

For this purpose the object of the invention is a trailer for moving a lightweight boat over ground and launching this boat, comprising a motor-driven supporting running gear, designed to hold the hull of the boat, extended by a longitudinal edge ending in a draw bar comprising a maneuvering handle, in particular at one of its ends, the longitudinal edge and the draw bar being arranged transversely to the longitudinal axis of the supporting running gear. According to a first aspect of the invention, the supporting running gear comprises:

a supporting frame, in particular tubular, arranged transversely to the longitudinal axis of the trailer, at least one sealed electric motor, in particular a motor reducer unit, fixed on the frame, two wheel assemblies arranged at the supporting running gear, each wheel assembly comprising at least two different wheels, the longitudinal edge being fixed to the frame of the supporting running gear by its end opposite from that is extended by the draw bar carrying control means to control the operation of the sealed electric motor.

The two different wheels could be different in size (diameter).

Each wheel assembly comprises one or more wheels equipped with shallow grooves and one or more wheels equipped with deep grooves.

According to a second aspect of the invention, the supporting running gear comprises:

a supporting frame, in particular tubular, arranged transversely to the longitudinal axis of the trailer, at least one sealed electric motor, in particular a motor reducer unit, fixed on the frame, at least two wheels, in particular two wheel assemblies, the longitudinal edge being fixed to the frame of the supporting running gear by its end opposite from that extended by the draw bar having control means to control the operation of the sealed electric motor, the supporting frame comprising at least one reinforcement part that extends over the motor and/or a reinforcement part that extends over the wheels.

According to a third aspect of the invention, the supporting running gear comprises:

a supporting frame, in particular tubular, arranged transversely to the longitudinal axis of the trailer, at least one sealed electric motor, in particular a motor reducer unit, fixed on the frame, at least two wheels, in particular two wheel assemblies, the longitudinal edge being fixed to the frame of the supporting running gear by its end opposite from that extended by the draw bar carrying control means to control the operation of the sealed electric motor, the draw bar comprising a sealed housing with a closing that offers access to at least one battery for powering the motor.

The frame can be a tubular frame arranged transversely to the longitudinal axis of the trailer.

The electric motor can be constituted of a sealed motor-reducer unit fixed to the frame, comprising two transmission shafts permanently engaged with the motor-reducer unit, disposed laterally, each transmission shaft presenting an end connected to the motor-reducer unit and an end near which it is fixed to the frame so as to be able to turn on itself freely.

The two wheel assemblies can each be mounted on the end of a transmission shaft so as to be able to turn around said shaft freely.

According to an embodiment of the invention, the trailer contains coupling means mounted on each of the wheel assemblies that are configured to enable the operator to make each of the wheel assemblies integral in rotation with the transmission shaft at the end of which it is mounted or, conversely, to make said wheel assembly free in rotation around said shaft.

The longitudinal edge can be fixed to the tubular frame of the supporting running gear by its end opposite from that extended by the draw bar. The draw bar also comprises control means to control the operation of the motor reducer unit, said means being activated by the maneuvering handle.

A trailer in the meaning of the invention is a motorized carriage, capable of conveying lightweight boats that can, but not necessarily, in certain situations, be coupled to a vehicle and be pulled by this vehicle. A lightweight boat in the meaning of this application is each water object that can be transported on a trailer, without a weight limit, particularly for sports boats, jet-skis, small fishing boats, etc.

The trailer according to the invention is configured to support at least one boat hull. The trailer comprises means to receive, hold and stabilize the hull, for example a strap or an elastic or flexible strip on which the boat is intended to rest and a V-block, with an adjustable aperture angle, disposed on the longitudinal edge.

A longitudinal or generally longitudinal edge is constituted according to the invention by an element arranged transversely or generally transversely to the axis of the supporting running gear, including angles between the longitudinal edge and the axis of between 60° and 90°.

According to different arrangements that can be combined with one another, the trailer according to the invention also presents various additional characteristics. Thus:

According to a specific arrangement, the trailer according to the invention also comprises a differential member coupled to the motor reducer unit upstream from the transmission shafts or directly integrated with the motor reducer unit.

According to another specific arrangement, the trailer is characterized in that a coupling means comprises two connectors respectively fixed to the internal and external flanks of the wheel assembly to which it is associated, each connector itself being associated with a dowel;

a connector comprising: a part forming a circular base of a given thickness and diameter, presenting a central circular opening, topped by a tubular part in the form of a cylinder of revolution, of a given thickness, and presenting an outer diameter substantially smaller than the diameter of the base; as well as an inner diameter substantially equal to the diameter of the circular opening arranged in the thickness of the washer, a diameter of the central circular opening of the base and the inner diameter of the tubular element being substantially equal, with a functional clearance, to the diameter of a transmission shaft, the base and the tubular part being integral with one another.

According to another specific arrangement, each transmission shaft is transversely crossed at its end by two passage openings enabling the insertion of a dowel while the tubular part of each of the connectors is also pierced by a passage opening, oriented transversely and enabling the passage of a dowel, the passage openings of the transmission shaft and each of the connectors are also arranged so that, when a wheel assembly equipped with its two connectors is fitted onto the end of the shaft, the opening traversing the tubular part of each of the connectors can be placed facing one of the openings traversing the end of the shaft so as to constitute a single opening in which a dowel can be inserted.

The coupling means dowels are dowels made with a pin pierced at its end to fit a locking system or dowels with a mobile tongue at their end that displaces transversely to lock the dowel or longitudinally so that the same dowel can be removed.

According to another specific arrangement, the coupling means dowels are cotter pins or beta pins.

According to another specific arrangement, each connector is fixed on the external or internal flank of the wheel assembly by bolts traversing the body of the connector and the wall of the rim.

According to another specific arrangement, each of the wheel assemblies is constituted of three wheels or constituted of several assembled wheels separated from one another by cross members, said wheels forming an integral part with one another by bolts traversing the base of each of the connectors and the walls of the rims of said wheels. Each wheel assembly comprises one or more wheels equipped with shallow grooves and one or more wheels equipped with deep grooves.

According to another specific arrangement, the supporting running gear comprises a supporting element, or launching cradle, intended to hold the hull of the boat.

According to another specific arrangement, the supporting element comprises a strap or an elastic or flexible strip, placed over the frame and fixed to the frame by two structures arranged at the ends of the frame.

According to another specific arrangement, the supporting element is a bearer constituted of the frame itself.

According to another specific arrangement, the draw bar comprises an extension, arranged in the vertical plane passing by the draw bar axis and inclined in relation to the vertical by a given angle. At its end, said extension comprises handles for maneuvering the trailer. The length of the extension and its tilt angle are defined so as to facilitate the implementation of said trailer by an individual.

According to another specific arrangement, the supporting running gear comprising an electric motor reducer unit, the draw bar integrates a compartment housing a removable battery power supply and a control housing comprising a variator connected to the motor reducer unit by an electric cable.

According to another specific arrangement, the trailer according to the invention also comprises attached means to recharge the battery power supply, these means comprising a photovoltaic power generation device, which can, according to another specific arrangement, have a flexible structure.

Advantageously, the trailer according to the invention resolves the transporting and storing problem caused by the use of an attached trailer.

Also, advantageously, the trailer according to the invention easily remedies, by its structure, the damage caused to it either by accidental shocks or by corrosion following its use near aquatic or marine areas and its contact by partial or even total immersion in aquatic or marine areas.

DESCRIPTION OF THE FIGURES

The characteristics and advantages of the invention will be better appreciated thanks to the following description, a description that relies on the appended figures which present.

DETAILED DESCRIPTION

For reasons of clarity of the presentation of the invention, the technical characteristics of the invention are presented in the rest of the description through several examples of embodiment specifically illustrated by associated FIGS. 1 to 19. However, the description of the invention shown by these examples of embodiment does not intend to limit the scope and extent of the invention claimed to this sole embodiment.

Some examples of embodiment of the invention are described in the FIGS., only in an exemplary manner. For ease of comparison and for reasons of clarity, for different examples of embodiment of the invention, all identical or similar elements have been designated by the same numbers, sometimes with a small additional letter.

All the criteria shown or described only for one example of embodiment of the invention can be also expected in all other examples of embodiment of the invention. Such examples of embodiment of the invention are also disclosed and are included in the invention.

As noted previously, the function of the trailer according to the invention is to move a boat to the shore from its parking or storage place, across an area of terrain not suitable for vehicles, such that the boat can be moved and launched without effort by a single person.

"Parking space" is understood to refer to, for example, the parking space on which the vehicle used to transport the boat to the launching site is parked. "Storage space" is understood to refer to, for example, the place near the shore where the boat is generally placed when it is not used. Such a location is, for example, constituted of a sheltered spot close to the shore, separated from the shore by an area of terrain not suitable for vehicles, grassland or beach, that the boat must cross to be launched.

Figure 1:
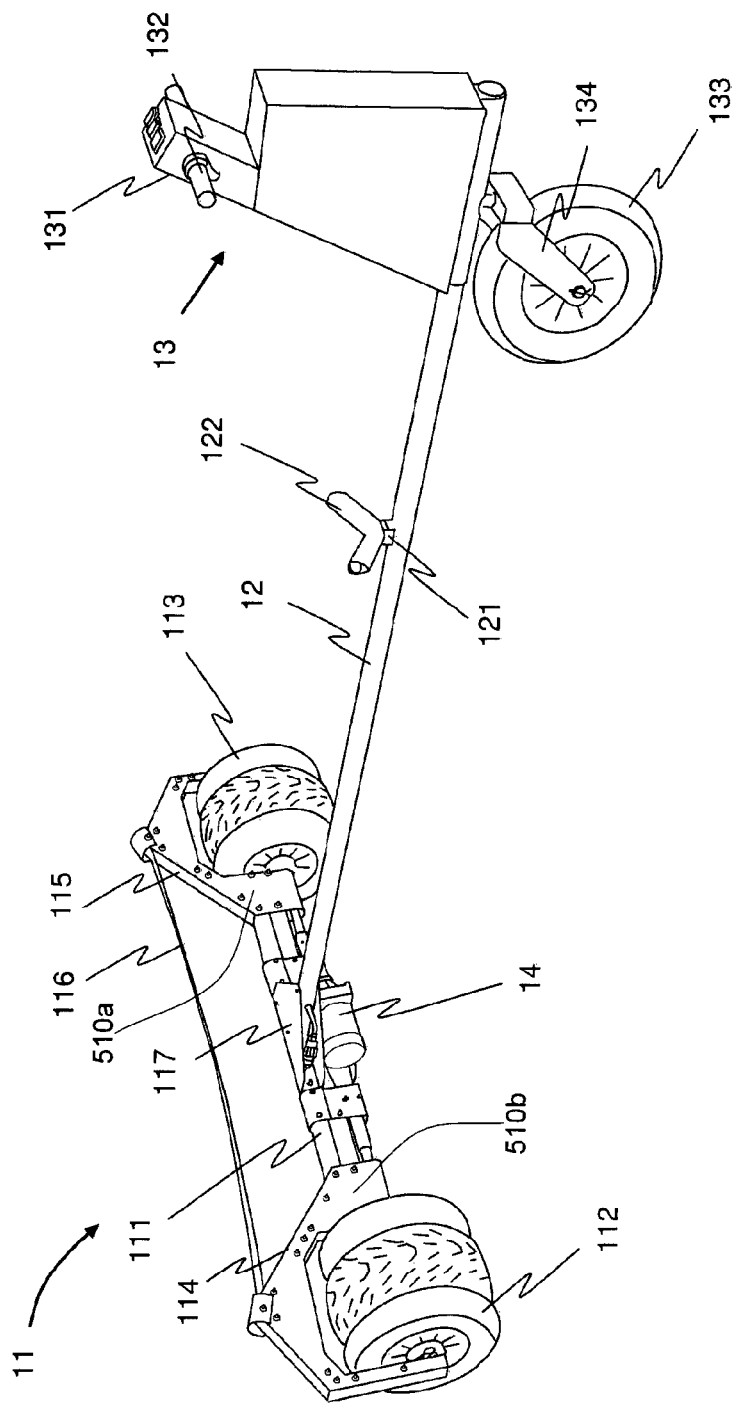
FIG. 1, a general schematic view, in perspective, of an example of embodiment of the trailer according to the invention.

To perform this function, the trailer according to the invention mainly comprises, as illustrated in FIG. 1, a running gear 11 formed of a tubular frame 111, connected to a rod or tube forming a longitudinal edge 12, one of the ends of which is fixed to the running gear 11, the other end being extended by an element 13 forming a draw bar.

To allow easy disassembly for transport, the longitudinal edge 12 is connected to the running gear 11 by removable fixation means. In addition, a quick-disconnect sealed connector 29, seen in FIG. 2, enables the running gear to be disconnected from the electric power supply cable housed in the longitudinal edge 12.

Figure 3:
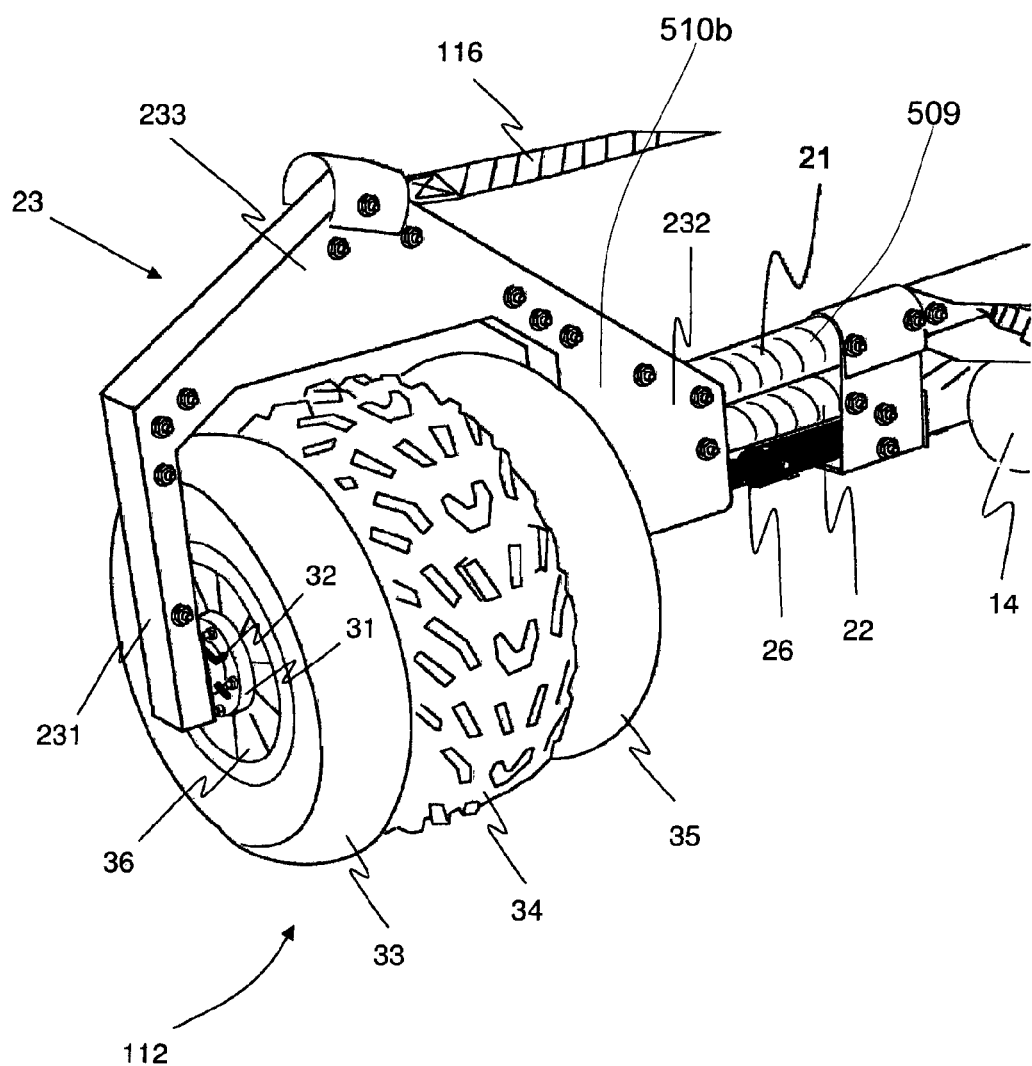
FIG. 3, a partial schematic view presenting an example of a wheel assembly that can equip the running gear of the trailer according to the invention, particularly in the embodiments of FIGS. 1 and 2.

According to the invention, the running gear comprises two wheel assemblies 112 and 113 disposed on both sides, each constituted of a set of several wheels assembled to one another at their rims, by means of bolts, for example. Thus each wheel assembly comprises, as illustrated in FIG. 3, at least one inner wheel 35 and one outer wheel 33, the inner flank of the rim of inner wheel 35, also known as the innermost wheel of the assembly under consideration, constituting the inner flank of wheel assembly 112 or 113, while the outer flank of the rim of outer wheel 33, also known as the outermost wheel of the assembly under consideration, constituting the outer flank of wheel assembly 112 or 113.

Element 13 forming a draw bar comprises an extension 131 intended for handling the trailer by the user and comprises handles 132 intended for this use.

This extension 131 is preferentially constituted of a tubular element, preferentially of rectangular cross-section, arranged in the vertical plane passing by the draw bar 13 axis and inclined in relation to the vertical by a given angle. At its end it comprises handles 132 for maneuvering the boat, the length of the extension and its tilt angle are defined so as to facilitate the implementation of said trailer by a single individual.

draw bar 13 also integrates a supporting element for holding the boat horizontally, this supporting element preferentially being constituted of a wheel 133, free in rotation, mounted on draw bar 13 through a yoke 134 configured so as to enable the wheel to pivot around a vertical axis, similar to "jockey" wheels that generally equip transport trailers.

The tubular structure 111 of running gear 11 supports a launching cradle intended to convey the boat, this launching cradle preferentially being constituted of two supporting elements 114 and 115 in folded sheets, supporting in their upper part a strap or an elastic or flexible strip 116 on which the boat is intended to rest. This launching cradle is associated with a V-block, with an adjustable aperture angle, disposed on the longitudinal edge 12 such that the bow of the boat rests therein, the support 121 preferentially being adorned with a cushion pad 122, a rubber pad for example.

Figure 2:
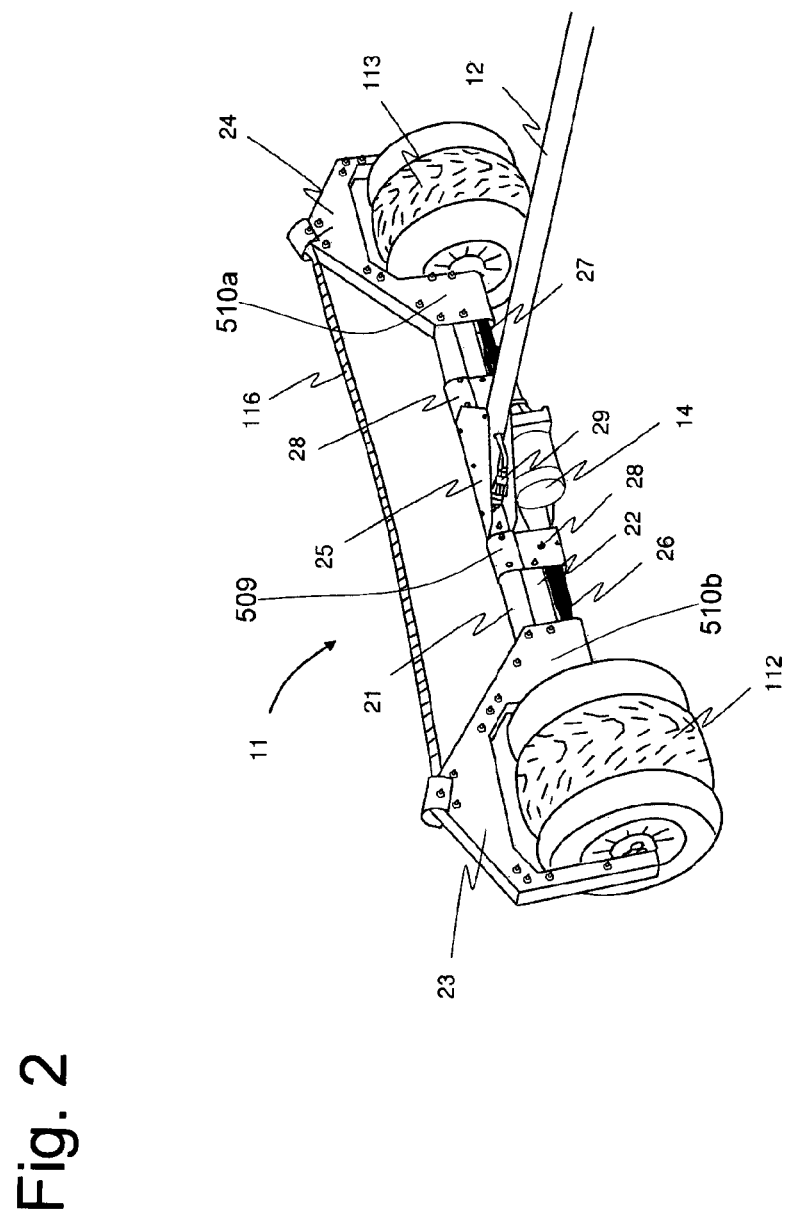
FIG. 2, a partial schematic view showing the various elements constituting the running gear (tractor axle) of the trailer according to the invention in the example of embodiment of FIG. 1.

As illustrated in FIG. 2, supporting elements 114 and 115 are preferentially constituted of two yokes 23 and 24, each comprises an inner post 232 or 242, an outer post 231 or 241 and an upper post 233, 243. The posts are arranged so that each yoke constitutes a structure presenting an inverted U-shape in the opening of which one of the wheel assemblies 112 or 113 is housed.

Supporting frame 111 comprises a part 509, (FIG. 2), specifically a reinforcement part, which extends over motor 14. Supporting frame 111 also comprises two parts 510a, 510b, specifically two reinforcement parts, which extend over wheels 112, 113. These reinforcement parts 509, 510a, 510b protect motor 14 and wheel assemblies 112, 113 in the event where the boat would be improperly positioned or would rock, and also in the event where the means for holding the boat in place do not function correctly.

Dimensionally, the wheelbase of running gear 11 as well as the length of longitudinal edge 12 are defined according to the length and the width of the boat for which it is intended.

In general, the mechanical structure of the trailer according to the invention is a lightweight dismountable structure, preferentially constituted of tubes in lightweight materials that are unsusceptible to corrosion, tubes in aluminum or a composite material for example, assembled to one another by bolts using plate connectors.

Advantageously, the dismountable structure thus adopted easily remedies the damage caused to different elements constituting the trailer, either by accidental shocks or by corrosion following its use near aquatic or marine areas and its contact by partial or even total immersion in aquatic or marine areas.

Alternatively, the structure can, however, be formed of tubular elements fixedly assembled by welding or bonding, in particular.

According to the embodiment considered, the tubular framework can comprise a single tube or alternatively two stacked tubes 21 and 22, as in the embodiment taken as an example and illustrated in FIG. 2.

It also comprises assembly means intended to integrate the various elements with one another. In the example of embodiment of FIG. 2, these assembly means are constituted of two lateral yokes 23 and 24.

According to the embodiment chosen, fixation 117 connecting running gear 11 to longitudinal edge 12 can consist of a single plate, fixed on the tubular framework by means of bolts for example, and on which the end of the longitudinal edge 12 is fixed.

Alternatively, it may consist of, as in the example of embodiment of FIG. 2, a horizontal yoke constituted of a folded sheet placed at the median part of running gear 11, enveloping upper tube 21, and to which the end of the longitudinal edge 12 is fixed by two bolts.

Yoke 25 comprises two triangular-shaped stacked flanks, these flanks being pierced with holes enabling four vertical pins to be placed, two simultaneously traversing the flanks and the upper tube 21, and two others simultaneously traversing the flanks and the longitudinal edge 12.

According to the invention, the tubular structure constituting the mechanical framework of running gear 11 is configured to integrate the motor reducer block 14 constituting the main drive member of the trailer. The function of this motor reducer block is to rotate the wheel assemblies 112, 113 situated on both sides of the structure through two transmission shafts 26 and 27, permanently driven by the motor reducer block, on which the wheel assemblies 112, 113 which constitute the motor axle of the trailer are directly mounted. Preferentially, the transmission shafts present a circular cross-section.

According to the mode of embodiment of the trailer according to the invention, the motor reducer block is mounted on structure 111 in the most simple and appropriate manner.

In the example of embodiment of FIG. 2, the motor reducer block 14 is an electronics block housed in a bearer 28, hanging from the structure and fixed to the structure by bolts. The structure of bearer 28 allows the passage of two transmission shafts 26 and 27 that are integral with the motor reducer block 14.

In addition, the free ends of shafts 26 and 27 hang from structure 111 by means enabling them to freely rotate, bearings housed in the lower part of lateral posts 231 and 232 or 241 and 242 of yokes 23 and 24 that couple the elements of the structure for example, as illustrated in FIG. 2.

FIG. 3 offers a detailed view of running gear 11 constituting the trailer according to the invention, a view which shows the motor reducer block, an assembly 112 of drive wheels 33, 34 and 35 and the mechanical and kinematic connection that connects the two elements.

As noted previously, each of the wheel assemblies 112 or 113 of the running gear constituting the motor axle of the trailer according to the invention is constituted of several assembled wheels (twin wheels, triple wheels, etc.) mechanically coupled to one another. In a preferred embodiment, the wheels are fixed to one another by their rims so as to form a single wheel. The fixation can for example be performed by means of bolts passing through said rims.

The use of several wheels assembled to one another advantageously enables assemblies with wide treads to be made, less likely to sink into soft ground, or into sand, from standard launching wheels, presenting thinner treads, but which are available on the market at a lower cost.

In a preferred embodiment, the wheel assemblies equipping the trailer can be constituted of at least two twin wheels 33 and 35, separated from one another by a cross member such that their grooves are in contact to prevent sand from entering between the two grooves and which are not, however, crushed against each other.

However, these wheel assemblies are ideally constituted, as illustrated in FIG. 3, of three twin wheels: Two wheels 33 and 35 equipped with shallow grooves, or even no grooves, separated by an intermediate wheel 34 equipped with a deeper groove, a notched wheel for example.

In this latter configuration, wheel assemblies are advantageously obtained that present sufficient ground traction to easily override the inertia of the trailer during operation and a sufficient tread surface so as to not sink into the ground in case of movement over very soft ground or sand. Advantageously, the association of wheels with shallow grooves and wheels with deep grooves, Or even very deep grooves, prevents, in case of slipping, the running gear from sinking and enables the trailer to be released very easily by shifting into reverse gear.

Figure 10:
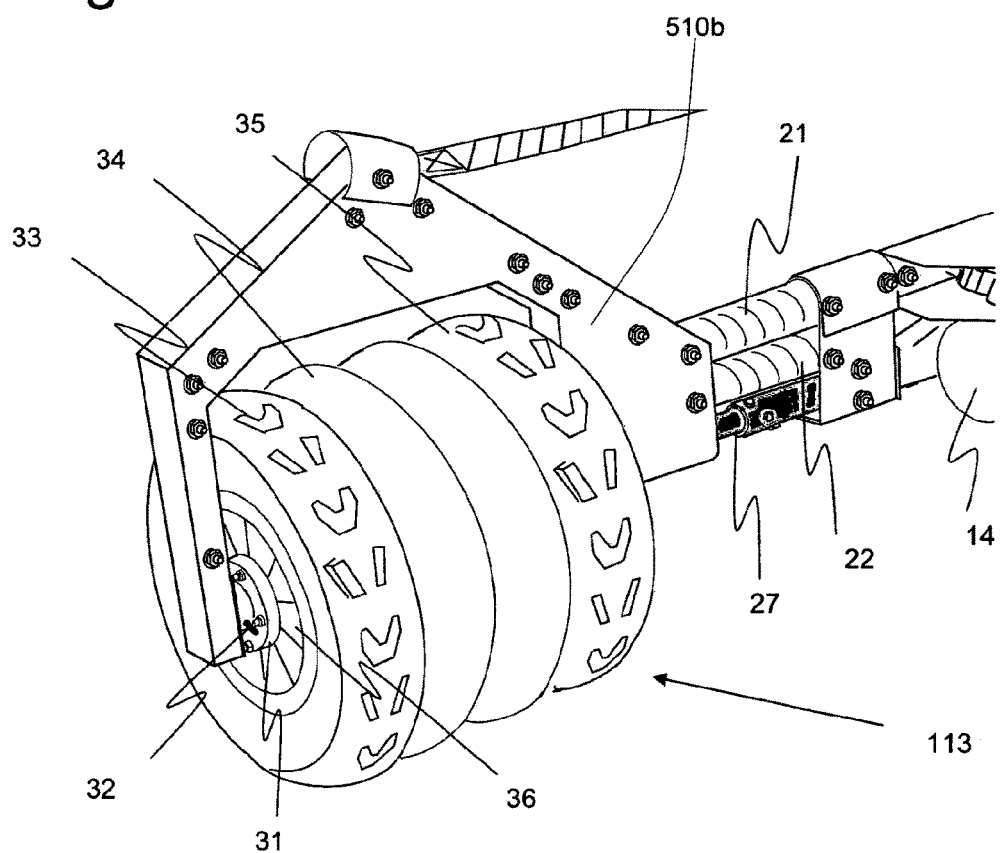
FIG. 10, a partial schematic view presenting another example of a wheel assembly that can equip the running gear of the trailer according to the invention, in the same way as in FIG. 3.

Another wheel assembly 113, as illustrated in FIG. 10, comprises four twin wheels: Two wheels 33 and 35 equipped with deep grooves, separated by two intermediate wheels 34 equipped with shallow grooves, or even no grooves, for example.

According to the invention, wheel assemblies 112 and 113 are directly mounted onto transmission shafts and are rotationally fixed with the latter.

In the example of implementation detailed here, wheel assemblies 112 and 113 are respectively mounted by their hubs onto the ends of transmission shafts 26 and 27 and each assembly is coupled to the corresponding shaft by a coupling device 31-32 that rotationally fixes it to the latter. Thus, an advantageously simple direct transmission device is obtained by the use of a motor reducer block 14.

According to the embodiment considered, the mechanical coupling between a transmission shaft 26 or 27 and the corresponding wheel assembly 112 or 113, coupling intended to rotationally fix the wheel assembly under consideration to the corresponding transmission shaft, can take different known forms and can be made using various coupling means.

However, according to the invention the coupling means implemented are configured to alternatively ensure driving of the wheel assembly under consideration by the transmission shaft on which it is mounted (engagement) or to leaving said wheel assembly free from any driving by said shaft (free wheel).

Figure 4:
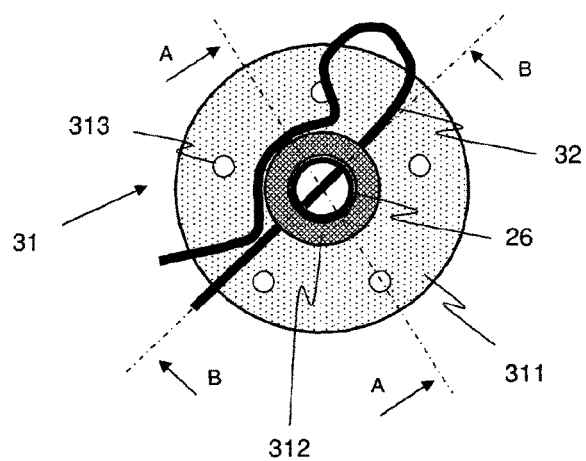
FIGS. 4 to 6, schematic views presenting an example of embodiment of removable connection means enabling the wheel assemblies to be integrally connected to the transmission shafts of the motor reducer unit, particularly in the embodiments of FIGS. 1 to 3.
Figure 5:
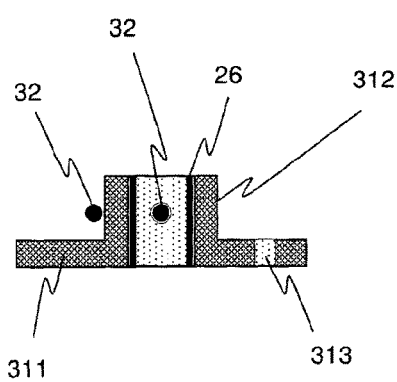
Figure 6:
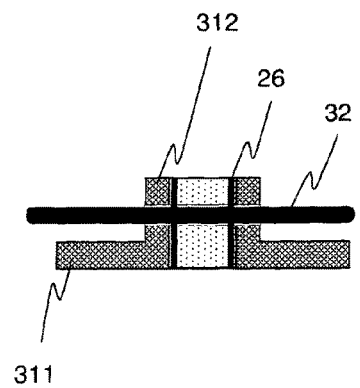

FIGS. 4 to 6 present an example of the device performing this coupling in an advantageously simple manner. This device, presented in the case of a wheel assembly comprising three wheels, or triple wheels, can be used immediately, without any specific adaptation, in the case of an assembly with two wheels, or twin wheels.

In the embodiment illustrated in FIGS. 4 to 6, the coupling device is constituted of two scotch blocks 31 and each block is associated with a dowel 32.

According to the invention, a scotch block 31 comprises two parts that are integral with one another: a circular base 311 of a given thickness and diameter, presenting a central circular opening, topped by a tubular part 312 in the form of a cylinder of revolution, of a given thickness, and presenting an outer diameter substantially smaller than the diameter of the base 311 as well as an inner diameter substantially equal to the diameter of the circular opening arranged in the thickness of the washer 311.

The diameter of the central circular opening of the base 311 and the inner diameter of the tubular element 312 are substantially equal, with a functional clearance, to the diameter of a transmission shaft, such that block 31 can be mounted onto the shaft.

The two parts 311 and 312 constituting a block 31 are juxtaposed and arranged in relation to each other such that the channel formed by tubular element 312 and the opening arranged in circular base 311 present collinear (aligned) axes of revolution. They are integral with one another.

Preferentially, the two parts of block 31 are made in a same element in a low-density material, in a piece of plastic material or in a piece of metal such as aluminum for example.

According to this embodiment, base 311 is pierced with holes 313 made at its periphery, preferably in a regular manner.

The cylindrical part 312 is pierced on both sides by two diametrically opposed transverse openings through which the rod of dowel 32 can be inserted.

The object of holes 313 made in the thickness of base 311 is to enable the base to be fixed on the flank, the outer or inner flank, of wheel assembly 112 or 113 against which the block 31 under consideration is placed, the fixation can be, for example, carried out by means of screws or bolts.

In a preferred form of embodiment of the invention, the holes made in base 311 are arranged such that they correspond to the holes made on the rims of wheels forming the wheel assembly 112 or 113 under consideration, such that said assemblies and their associated blocks can be fixed together by a single set of bolts.

According to this embodiment, each of the transmission shafts 26 or 27 comprises, near its end, two transverse perforations enabling the rod of a dowel 32 to be inserted. In the case where the shaft is a hollow tubular shaft, this perforation consists of two diametrically opposed holes.

These transverse perforations are also positioned along the transmission shaft under consideration such that, when wheel assembly 112 or 113 is mounted onto corresponding transmission shaft 26 or 27 and as blocks 31 are positioned, the perforations made in the shaft coincide with the transverse openings made in the tubular element 312 of each of the blocks 31 such that a dowel 32 can be inserted into the opening as defined, as illustrated in FIGS. 4 to 6.

The insertion or removal of the dowel thus, in an advantageously simple manner, rotationally fixes the wheel assembly 112 or 113 under consideration to the corresponding transmission shaft or, conversely, leaves the wheel assembly free from any driving by said shaft.

Figure 11:
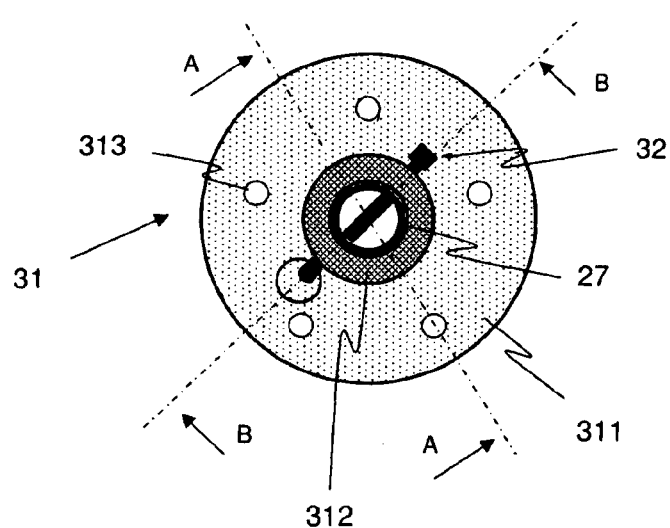
FIGS. 11 to 13, schematic views presenting another example of embodiment of removable connection means enabling the wheel assemblies to be integrally connected to the transmission shafts of the motor reducer unit, in the same way as in FIGS. 4 to 6.
Figure 12:
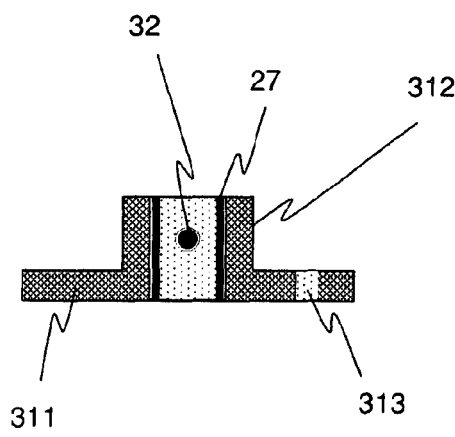
Figure 13:
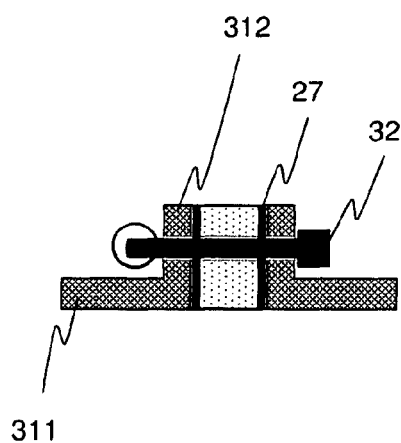
Figure 14:
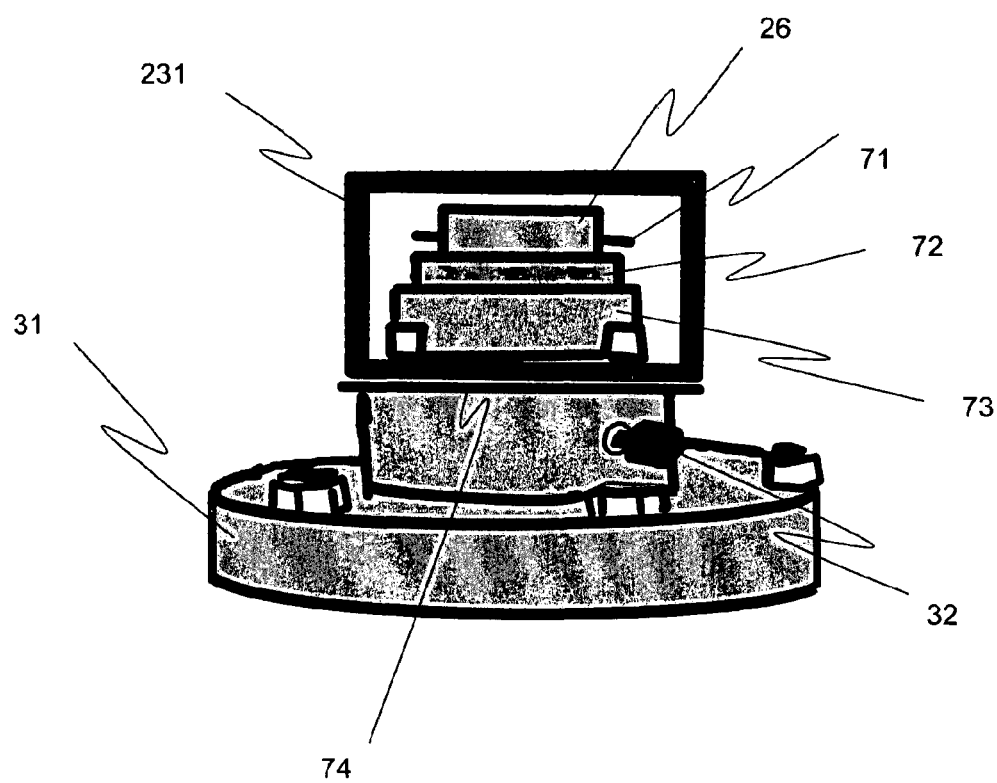
FIG. 14, a schematic representation of other means enabling the wheel assemblies to be kept in place on the bearing structure of the running gear, in the same way as in FIG. 7.

FIGS. 11 to 13 present another example of a device performing this coupling in an advantageously simple manner, which is similar to the device from FIGS. 4 to 6. Here dowel 32 is replaced by a pin 32.

Said pin 32 comprises at its end a system that holds it in place, a split ring for example, as shown in FIG. 13.

It should be noted that the function of the mechanism for coupling the wheel assembly under consideration 112 or 113 to the corresponding transmission shaft 26 or 27 is obviously not to ensure the lateral maintenance of the wheel along the shaft or to hold the shaft itself in place.

Subsequently, wheel assemblies 112 and 113 and transmission shafts 26 and 27 are held in place by the lower ends of the lateral outer posts 231 and 241 and inner posts 323 and 242 of the two yokes 23 and 24.

In addition, the lower ends of posts are configured to each house a bearing traversed by the corresponding transmission shaft 26 or 27, a bearing specifically intended to facilitate the rotation of the latter.

Figure 7:
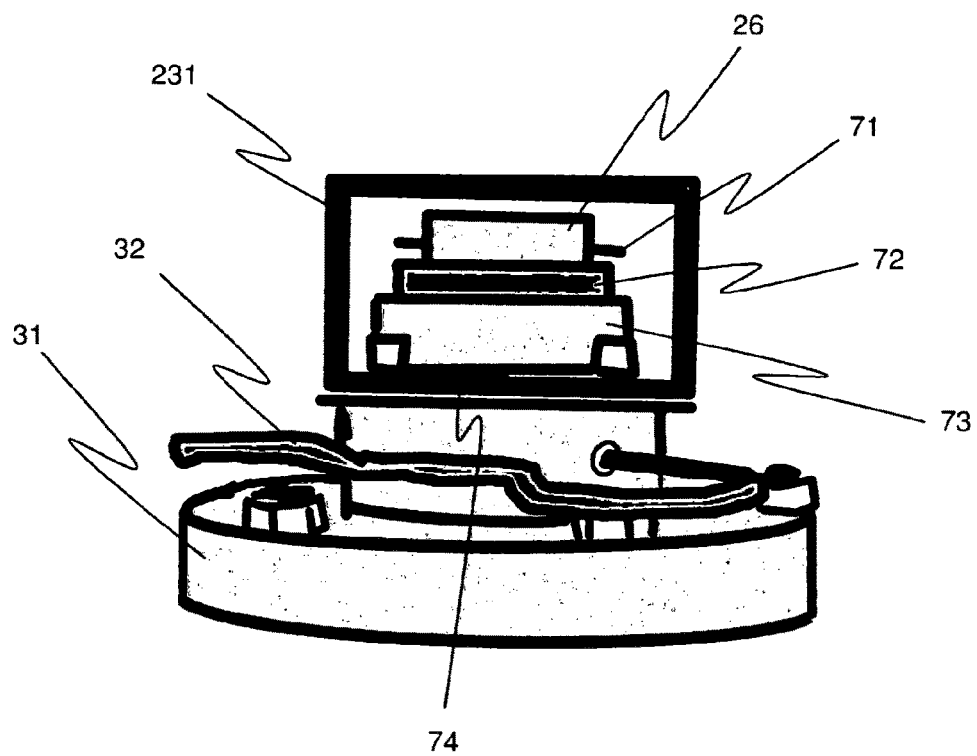
FIG. 7, a schematic representation of means enabling the wheel assemblies to be kept in place on the bearing structure of the running gear.

In a preferred embodiment, illustrated by FIG. 7, the end of transmission shaft 26 or 27 is equipped with a bearing 73 configured such that the inner wall 74 of the lateral outer post of corresponding yoke 23 or 24 is supported on the outer wall of said bearing. In addition, the transmission shaft 26 or 27 under consideration presents a transverse perforation, intended to accommodate an elastic dowel 71 preventing the ends of the transmission shaft from sliding along the inner wall of bearing 73. Bearing 73 is also protected by a washer 72 positioned between it and the elastic dowel 71.

As noted previously, the motor reducer unit intended to equip the device according to the invention is a compact assembly comprising an electric motor associated with a gear reduction system.

The assembly is mounted in a sealed housing or casing, such that the motor reducer block can advantageously be exposed to bad weather without damage and can even be momentarily immersed in water. This is especially the case when, for convenience, the boat is launched by using a slip, the trailer then being at least partially immersed in water.

The housing of the motor reducer block also presents two sealed holes oriented in two opposite directions, by which the transmission shafts exit at the ends of which the wheel assemblies of the trailer are mounted.

In a preferred embodiment, the motor reducer block integrates a differential member placed upstream from the transmission shafts (26, 27) or integrated with the motor reducer block (14).

According to the invention, the motor reducer block is supplied with electric power by a battery capable of delivering sufficient power to enable the motor to operate at maximum power, and the capacity of which ensures sufficient back-up for the trailer.

Figure 8:
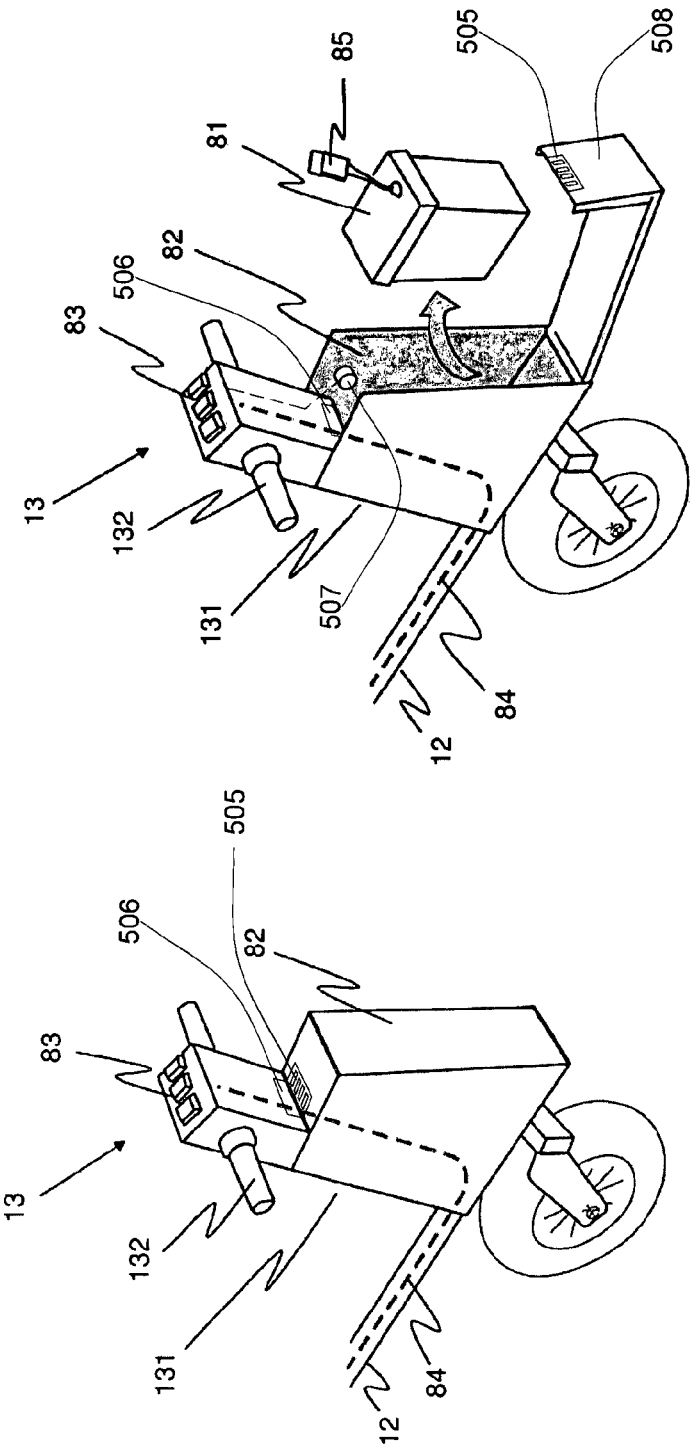
FIGS. 8a and 8b, schematic views presenting an example of embodiment of the vertical extension of the draw bar with the handle for controlling movements of the trailer according to the invention as well as an example of embodiment of the power supply and motor control device mounted on the running gear.

In the embodiment taken as an example, battery 81 is housed in a compartment 82, placed on the draw bar 13 and integral with extension 131, as illustrated in views 8-a and 8-b of FIG. 8.

Compartment 82 is constituted of a housing that contains a closing 508. A lock, specifically a combination lock, is used to lock the housing. The lock contains an element 506 fixed to the closing and an element 505 fixed to the housing, the two elements 505, 506 can be locked to one another.

In compartment 82 a main switch 507 (FIG. 8b) is arranged such that it is accessible only if the closing is open to prevent the trailer from being used by unauthorized persons.

Battery 81 is a removable battery configured to be able to be extracted from compartment 82, for maintenance or simply for recharging, in particular. For this purpose, compartment 82 comprises a sealed connection component 85, to which battery 81 is connected when it is placed in the compartment.

This connection component is connected to a control housing 83 mounted on extension 131 of draw bar 13, activated by the operator via handles 132, the housing itself comprising a variator that transfers electrical energy from battery 81 to motor reducer unit 14 via a supply cable shown by the arrow in dotted lines 84. This cable passes inside longitudinal edge 12, the latter preferentially being constituted of a hollow tubular structure, for obvious weight reasons.

The end of the supply cable is equipped with a sealed plug 29, seen in particular in FIG. 2, to which the power outlet of the motor reducer block 14 is connected.

According to the invention, the electric motor of the motor reducer block delivers sufficient torque and power, considering the nature of the terrain on which the trailer must move, to enable the trailer to turn on from the off position and to drive it under maximum load conditions. In the example of implementation described here, the trailer being intended to move on soft ground by conveying a boat with a maximum length of approximately 5 meters and a maximum weight of approximately 200 kg, the motor used develops a power of approximately 800 watts under a supply voltage of 24 volts or under a different and sufficient voltage.

Figure 15:
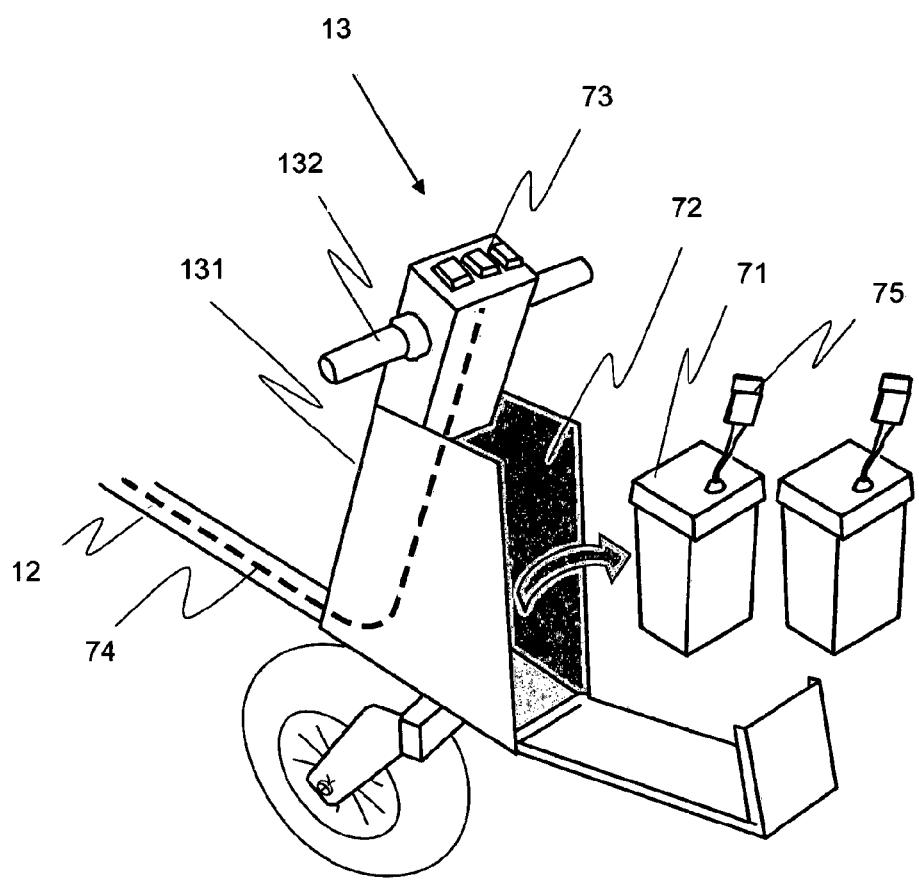
FIG. 15, a schematic view like FIG. 8b presenting another example of embodiment of the vertical extension of the draw bar with two batteries.

To supply the motor with electricity, one or more batteries can be placed in the battery compartment. In the case where there are several batteries, the user can switch from one battery to another such that he has a back-up reserve when a battery is empty. FIG. 15 shows that the housing compartment is large enough to contain two batteries.

The batteries used are LiFePo4 technology batteries and can present a capacity of 10 to 30 Ah.

It should be noted that as the battery or batteries are removable, the latter can advantageously be recharged in various ways.

The battery can thus be stored and transported in a space having a power supply and can be charged by using a suitable charger.

Alternatively, the battery can be recharged in situ in its housing, by applying the appropriate charging voltage, by means of an autonomous electric power source such as a removable photovoltaic panel that can be fixed to the trailer or placed on the boat.

Figure 9:
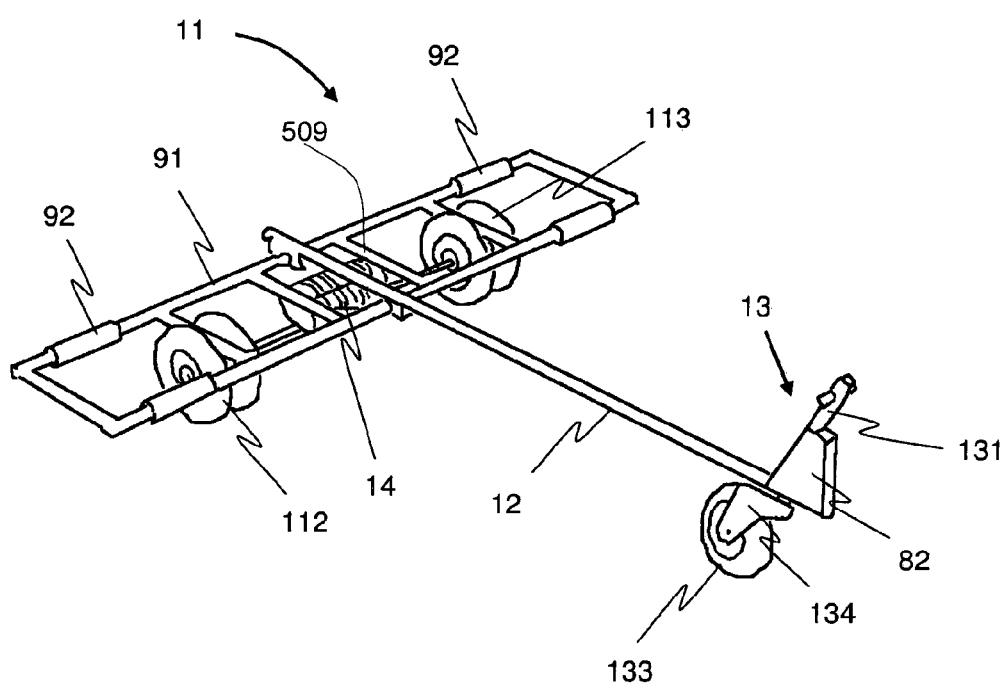
FIG. 9, a general schematic view, in perspective, of another example of embodiment of the trailer according to the invention adapted for displacing catamaran-type boats.

FIG. 9 presents an embodiment of the trailer according to the invention adapted for displacing catamaran-type boats. This embodiment, close to the embodiment described by way of example of implementation in the previous text, continues the essential technical elements of the invention as described for the previous embodiment.

Thus we find a running gear with a tubular framework and a motor reducer unit capable of driving two wheel assemblies arranged on both sides of the framework, a longitudinal edge as well as a draw bar with a "jockey" wheel type device, the draw bar presenting an extension enabling the trailer to be activated and guided and that can comprise a battery housing. These common technical elements that bear identical reference marks therefore are not described again.

On the other hand, this embodiment differs from the previous in that, although essentially presenting a tubular structure, framework 91 of running gear 11 presents a configuration different from that presented by framework 111 of the previous example of embodiment.

As illustrated schematically in FIG. 9, this framework thus is present in the form of a tubular ladder frame, substantially rectangular, on which wheel assemblies 112 and 113 are fixed, through yokes for example, and under which the motor reducer block 14 is suspended. The longitudinal edge 12 here is rigidly fixed to the tubular frame perpendicularly to the axis of the wheel assemblies, so as to occupy a median position, as illustrated in FIG. 9. The tubular frame 91 also comprises damping bushes 92 surrounding the transverse tubular elements arranged along these elements in such a way that a catamaran placed on the trailer can rest on the bearer supported by its two hulls on the damping bushes 92.

Figure 16:
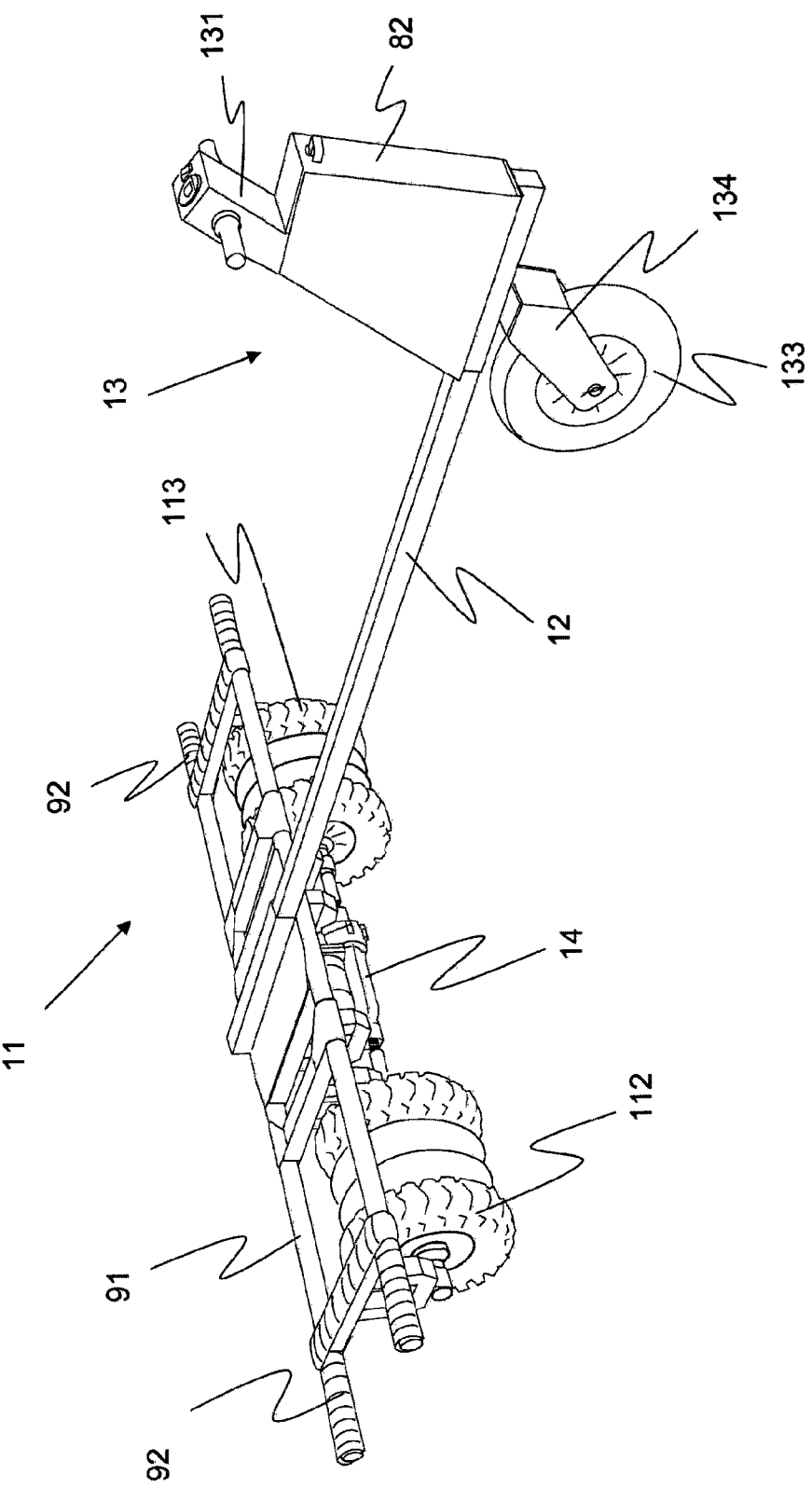
FIG. 16, a general schematic view, in perspective, of another example of embodiment of the trailer according to the invention adapted for displacing catamaran-type boats, in the same way as in FIG. 9.

As illustrated schematically in FIG. 16, another embodiment of the trailer according to the invention suitable for the displacement of a catamaran-type boat comprises a supporting frame that extends over the motor and that extends over the wheels.

Figure 17:
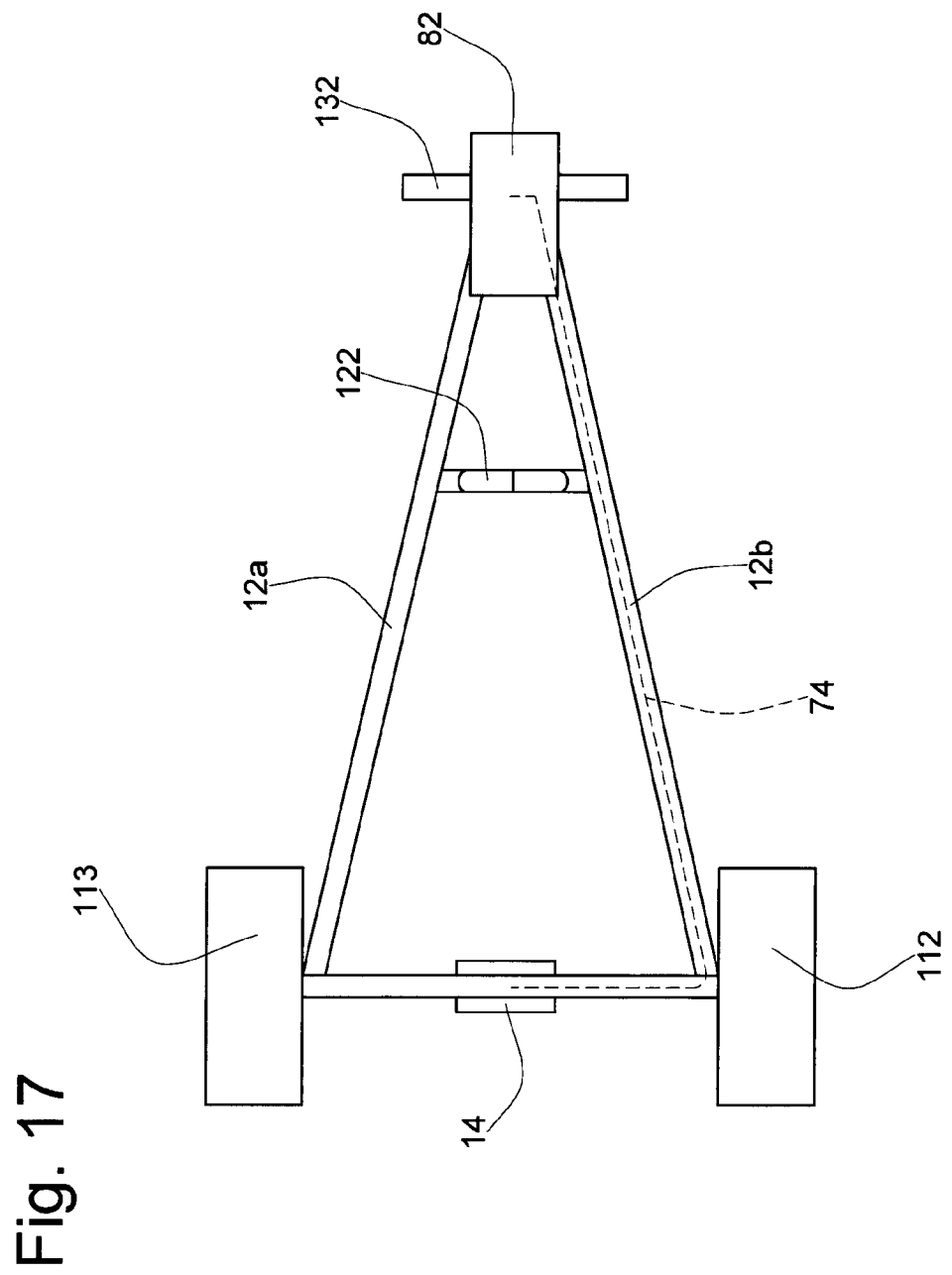
FIG. 17, a general schematic view, from above, of another example of embodiment of the trailer according to the invention with two longitudinal edges being fixed to the frame forming a triangle with the running gear.

As illustrated schematically in FIG. 17, another embodiment of the trailer according to the invention comprises two longitudinal edges 12a and 12b generally being arranged transversely in relation to the axis of the supporting running gear (11), fixed to the frame and forming a triangle with the supporting running gear.

Figure 18:
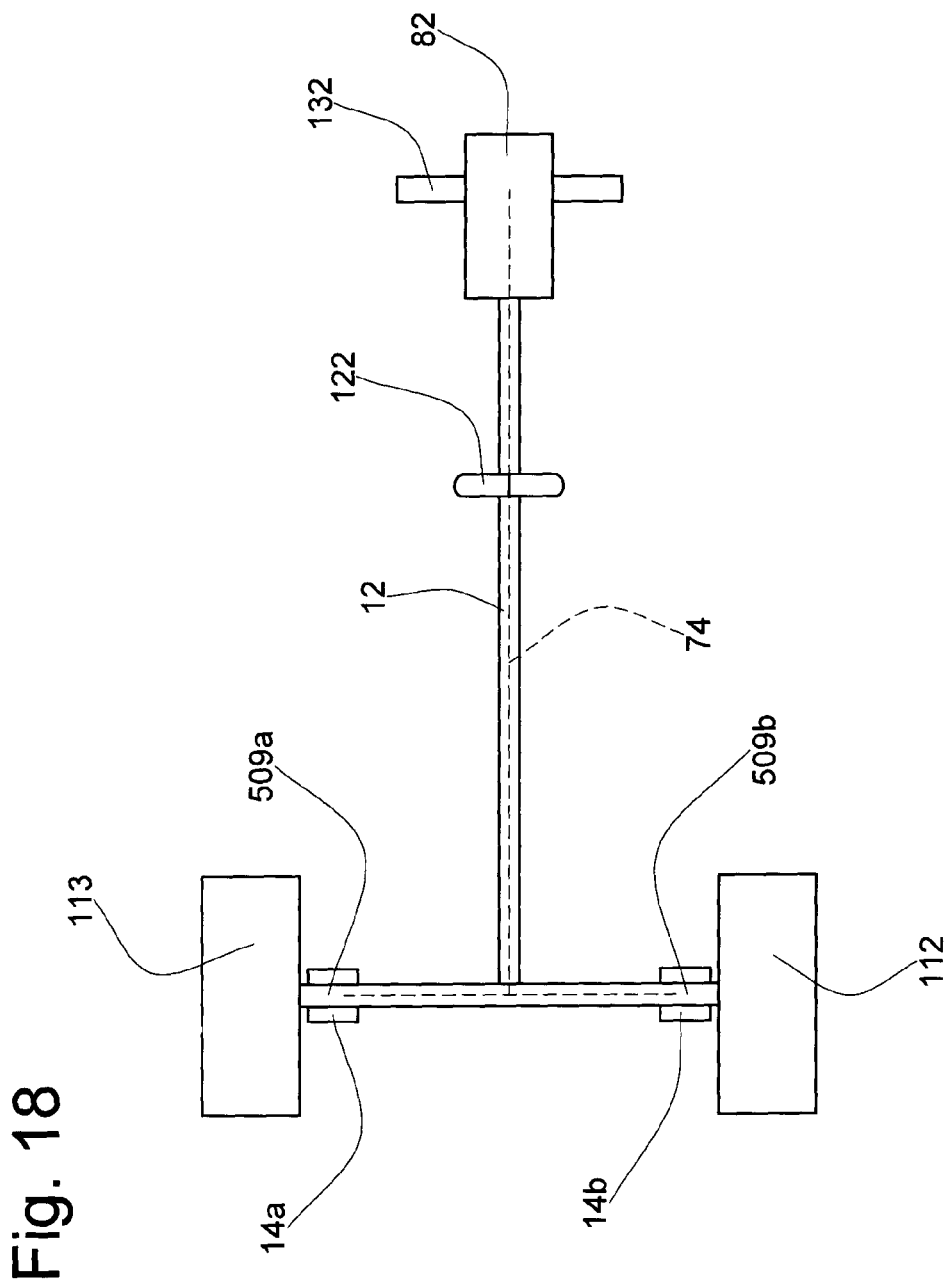
FIG. 18, a general schematic view, from above, of another example of embodiment of the trailer according to the invention with one longitudinal edge being fixed to the frame, the running gear comprising two electric motors, each associated with a wheel or a wheel assembly.

FIG. 18 offers a schematic view of another embodiment of the trailer according to the invention that comprises two independent electric motors 14a, 14b, each associated with a wheel assembly 112, 113.

Figure 19:
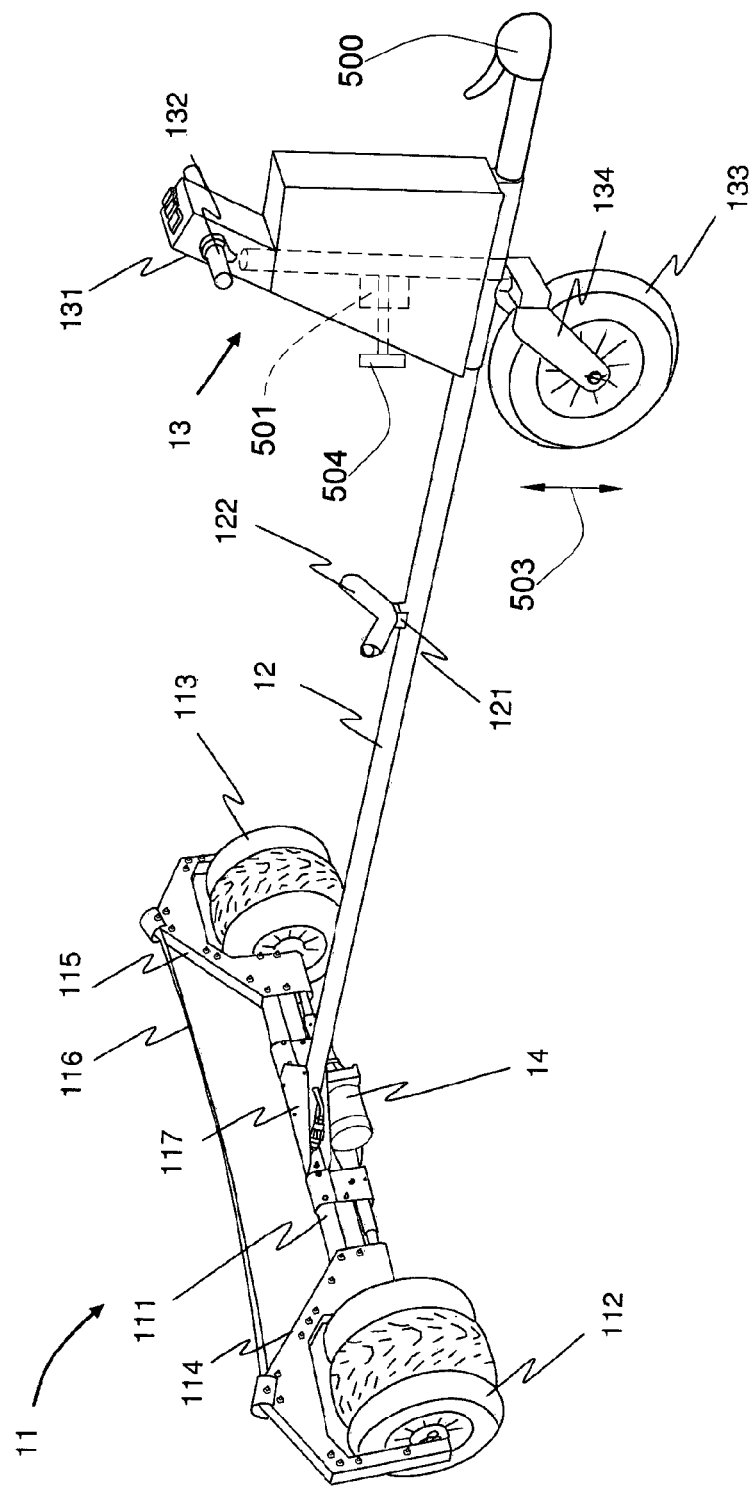
FIG. 19, a general schematic view, in perspective, of another example of embodiment of the trailer according to the invention comprising a coupling head adapted to be connected to a vehicle, intended to be towed by the vehicle at a speed of less than 30 km/hour.

Finally, FIG. 19 presents another example of embodiment of the trailer according to the invention that comprises a coupling head 500 adapted to be connected to a vehicle, not illustrated. Device 501 enables wheel 133 to be displaced upward (in direction 503) and button 504 enables the vertical position of wheel 133 to be fixed.

However, these technical differences, that result from a process to adapt the trailer according to the invention to the type of boat displaced, do not call the overall structure of the invention into question.

The invention claimed is:
1. A trailer for moving a lightweight boat over ground and launching the boat, comprising;
    a motor-driven supporting running gear designed to hold at least one hull of the boat, extended by a longitudinal edge ending in a draw bar having a maneuvering handle, the longitudinal edge being transverse or generally transverse to an axis of the supporting running gear, a supporting frame extending transversely to a longitudinal axis of the trailer, a sealed electric motor fixed on the frame, two wheel assemblies at the supporting running gear and each comprising at least two differently shaped ground-engaging wheels laterally adjacent each other, the longitudinal edge being fixed to the frame of the supporting running gear by an end opposite that extended by the draw bar, and control means on the draw bar to control the operation of the sealed electric motor.

2. A trailer according to claim 1, further comprising a reinforcement part on the supporting frame and extending horizontally over the motor and/or over the wheels to protect same from damage from above.

3. The trailer according to claim 1, further comprising:

a motor-reducer unit including the sealed electric motor is fixed to the frame; and two transmission shafts permanently engaged with the motor-reducer unit, disposed laterally, each transmission shaft presenting an end connected to the motor-reducer unit and an end fixed to the frame so as to be able to turn on itself freely.

4. The trailer according to claim 3, further comprising:

at least two wheels each mounted on the end of a transmission shaft so as to be able to freely rotate around the respective transmission shaft.

5. The trailer according to claim 4, further comprising:

coupling means mounted on each of the wheel assemblies that are configured to enable the operator to make each of the wheel assemblies rotate jointly with the transmission shaft to which it is mounted or, conversely, to make said wheel assembly free in rotation around said shaft.

6. The trailer according to claim 3, further comprising:

a differential member coupled to the motor-reducer unit upstream from the transmission shafts or directly integrated with the motor-reducer unit.

7. The trailer according to claim 1, wherein the control means for controlling the operation of the sealed electric motor are activated by the maneuvering handle.

8. The trailer according to claim 1, wherein the draw bar comprises a sealed housing with a closure that offers access to at least one battery to supply the motor, and in that the housing comprises a lock to lock the closing.

9. The trailer according to claim 1, wherein the draw bar comprises a sealed housing with a closure that offers access to at least one battery to supply the motor, a main switch being placed in a compartment of the housing.

10. A trailer for moving a lightweight boat over ground and launching the boat, comprising:

a motor-driven supporting running gear designed to hold at least one hull of the boat, extended by at least one longitudinal edge ending in a draw bar having a maneuvering handle, the longitudinal edge being transverse or generally transverse to an axis of the supporting running gear, wherein the supporting running gear comprises:

a supporting frame extending transversely to a longitudinal axis of the trailer, a sealed electric motor fixed on the frame, at least two wheels, the longitudinal edge being fixed to the frame of the supporting running gear by its end opposite from that extended by the draw bar, the draw bar further comprising control means to control the sealed electric motor, and a sealed housing on the draw bar and having a closure that offers access to at least one battery for powering the motor.

* * * * *